Figure 3:
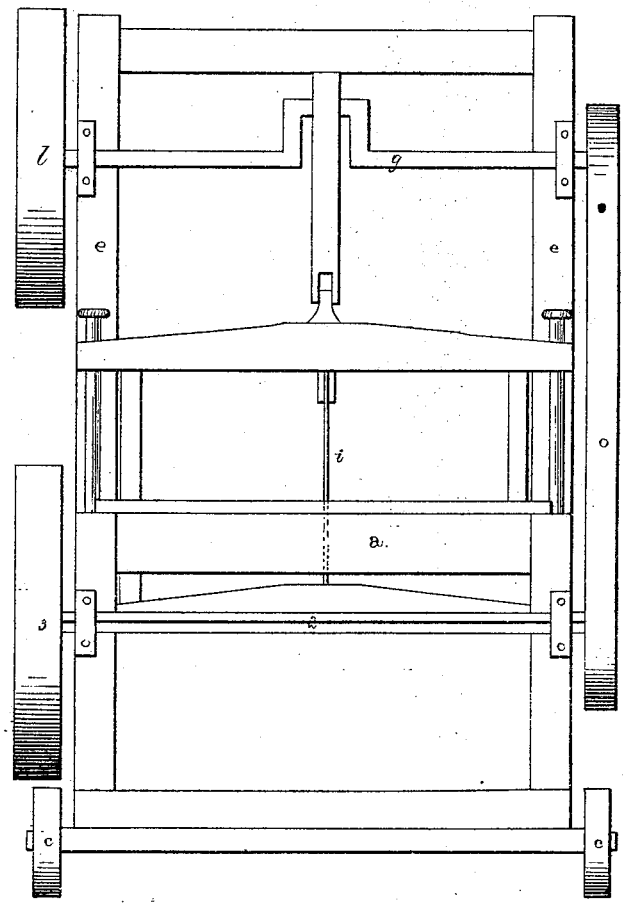

2 Sheets--Sheet 1.
P. M. ANDRIOT.
Sawing-Machines.
No. 141,479. Patented August 5, 1873.
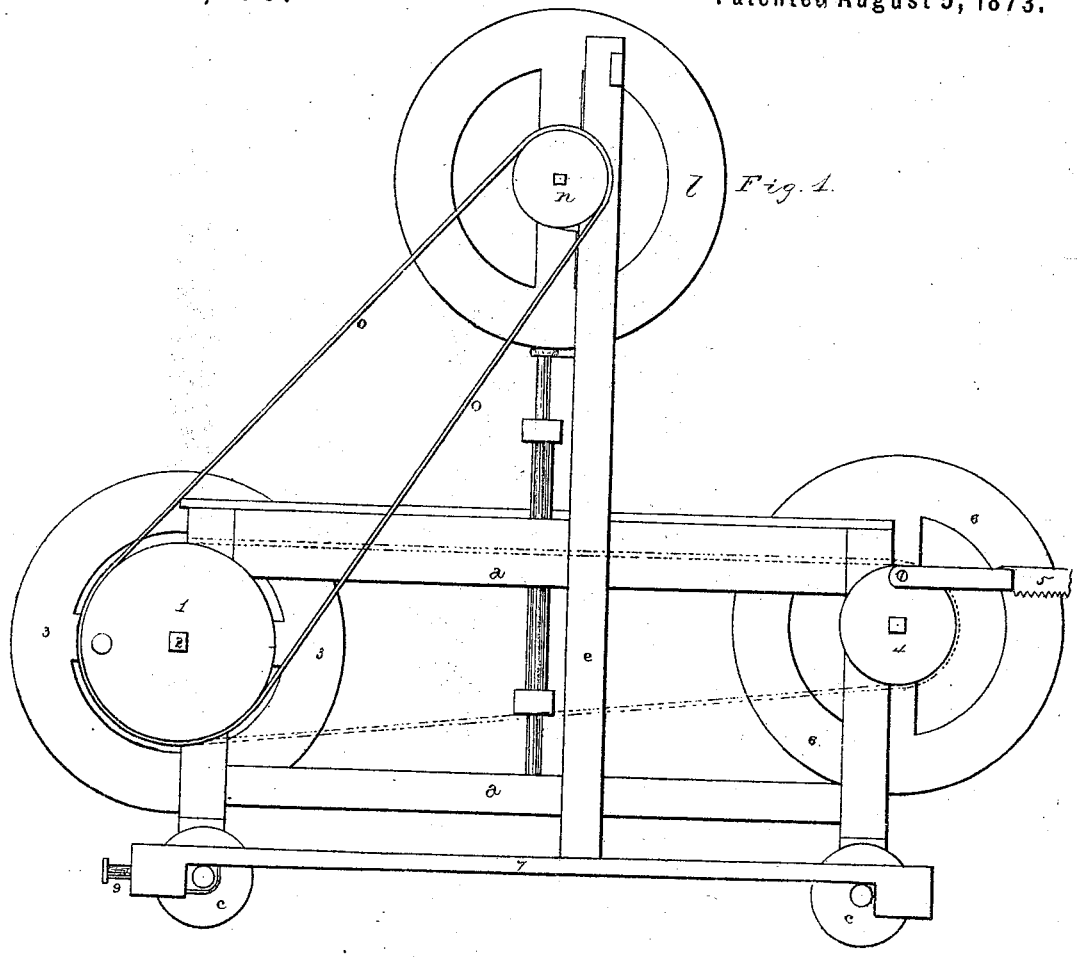
WITNESSES.
J. Dennis Jr.
Wm E. Chaffee
INVENTOR.
Peter Maurice Andriot
By Daniel Breed Atty.

2 Sheets--Sheet 2.

P. M. ANDRIOT.
Sawing-Machines.

No. 141,479.  Patented August 5, 1873

WITNESSES.
J. Dennis Jr
Wm E Chaffee

INVENTOR.
Peter Maurice Andriot
By Daniel Breed Atty

UNITED STATES PATENT OFFICE.

PETER M. ANDRIOT, OF OXFORD, OHIO.

IMPROVEMENT IN SAWING-MACHINES.

Specification forming part of Letters Patent No. 141,479, dated August 5, 1873; application filed April 21, 1873.

*To all whom it may concern:*

Be it known that I, PETER M. ANDRIOT, of Oxford, county of Butler, State of Ohio, have invented certain new and useful Improvements in Sawing-Machines; and the following is a full description of the same.

The nature of my invention relates to an improvement in sawing-machines; and it consists in the arrangement and combination of devices, which will be more fully described hereafter, by which a cheap portable machine is produced and which is adapted to both vertical and horizontal work.

Figure 1 is a side elevation of my machine. Fig. 2 is a detached view of the device for locking the wheels. Fig. 3 is an end view of my machine.

$a$ represents the frame, of any suitable size or construction, and which is placed upon the wheels $c$, so that it can be readily transported from place to place. Extending upward from each side of the frame is a standard, $e$, upon which the crank-shaft $g$ for operating the vertical saw $i$ is journaled. Upon one end of the shaft is secured a fly-wheel, $l$, and upon the other a driving-pulley, $n$, which is operated by the belt $o$ from the driving-wheel 1. This driving-wheel is placed upon a shaft, 2, having upon its other end a fly-wheel, 3, and which may be operated either by the crank upon the wheel 1, or by a treadle, whichever may be desired.

When it is desired to use a horizontal saw, instead of the vertical one $i$, the belt $o$ is taken off and another one, as shown in dotted lines, passing around a second pulley, 4, placed on a plane with the driving-wheel, is used, and which operates the horizontal saw 5. To the opposite end of the shaft to which the pulley 4 is secured is attached a third fly-wheel, 6—these fly-wheels being so arranged that when the machine is in use two of them will be in constant motion.

When it is desired to lock the wheels, so that there will be no end movement of the machine while in operation, a bar, 7, long enough to extend over the wheels on each side, and which have curved shoulders 8 formed upon the inner sides, is placed over the wheels, as shown in Fig. 1. Through these shoulders is passed a set-screw, 9, which locks the wheels firmly in place; or, if the machine is to be used for some time upon the same spot, the wheels may be removed entirely and the frame rest upon the ground.

Having thus described my invention, what I claim as new, and desire to secure by Letters Patent, is—

The bars 7, constructed as described, and used for locking the wheels, substantially as set forth.

PETER MAURICE ANDRIOT.

Witnesses:
P. H. CONE,
F. J. CONE.